United States Patent [19]

Ohira

[11] Patent Number: 5,394,188
[45] Date of Patent: Feb. 28, 1995

[54] HIGH VOLTAGE STABILIZING CIRCUIT FOR USE IN COLOR TELEVISION RECEIVERS

[75] Inventor: Yoshifumi Ohira, Saitama, Japan

[73] Assignee: Kabushiki Kaisha Toshiba, Kawasaki, Japan

[21] Appl. No.: 74,758

[22] Filed: Jun. 10, 1993

[30] Foreign Application Priority Data

Jun. 15, 1992 [JP] Japan ................................. 4-154926

[51] Int. Cl.$^6$ ............................................ H04N 3/185
[52] U.S. Cl. ..................................... 348/327; 348/377
[58] Field of Search ......................... 358/242, 243, 74; 348/327, 377

[56] References Cited

U.S. PATENT DOCUMENTS

4,901,156  2/1990  Yook ..................................... 358/243
4,996,590  2/1991  Okamoto et al. ...................... 358/74

FOREIGN PATENT DOCUMENTS

57-100365  6/1982  Japan .
3-56509    8/1991  Japan .

*Primary Examiner*—James J. Groody
*Assistant Examiner*—Cheryl Cohen
*Attorney, Agent, or Firm*—Cushman, Darby & Cushman

[57] ABSTRACT

An anode voltage (high voltage) of a CRT is detected by a voltage division. When it is detected by a comparator that the reduction of the high voltage has exceeded the controlled range of a high voltage stabilizing loop, two switches will be on. When one switch is on, the controlling end of a processing circuit controlling the luminance will be low in the potential and the direct current level or amplitude of a video signal will be limited. Thereby, the luminance will be controlled and the high voltage will become high. Meanwhile, when the other switch is on, the ABL operating voltage will forcibly become low and, even after the two switches become off, the average level of the luminance will be controlled. Thereby, the high voltage will return within a short time into the controlled range of the high voltage stabilizing loop and will be stabilized.

10 Claims, 4 Drawing Sheets

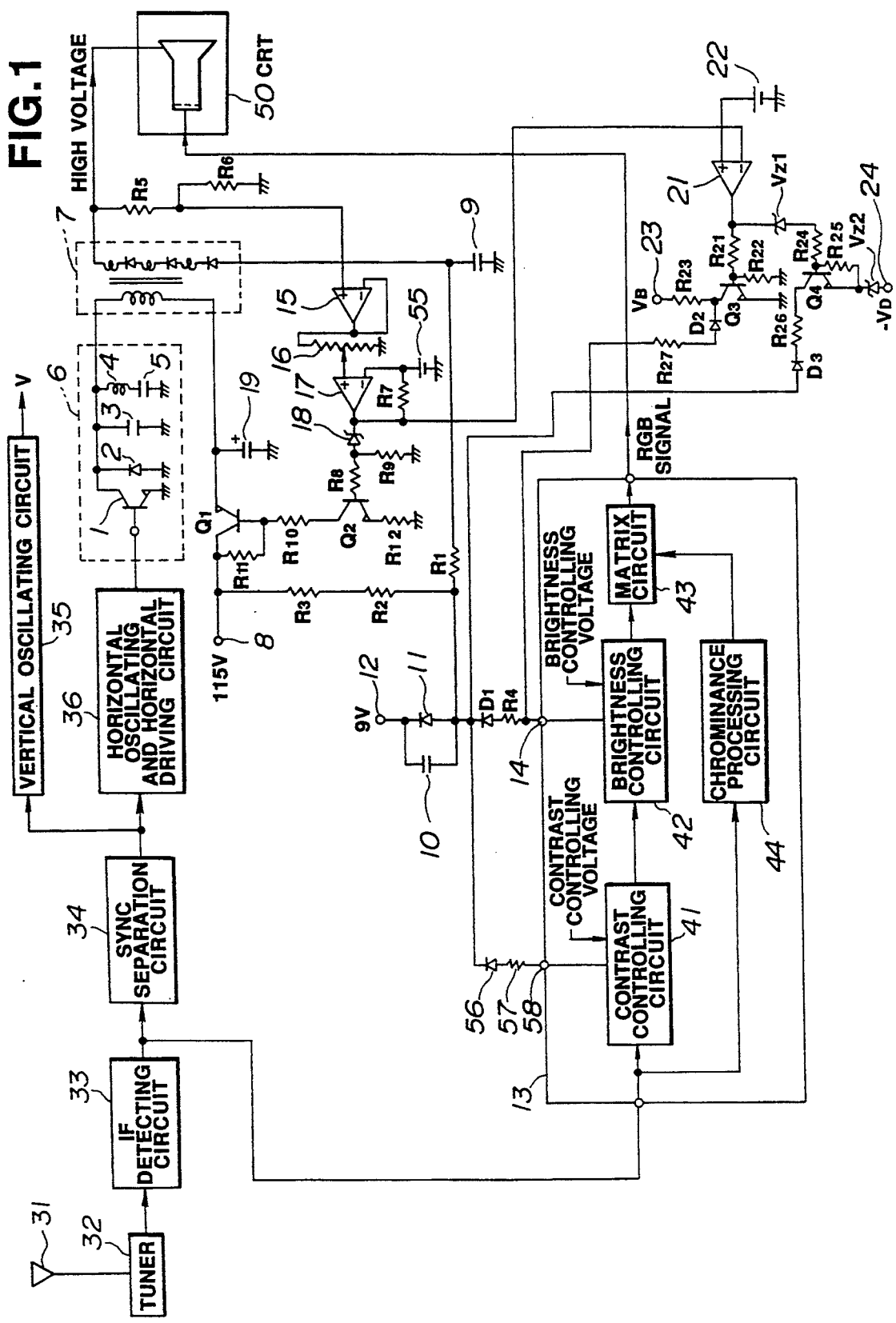

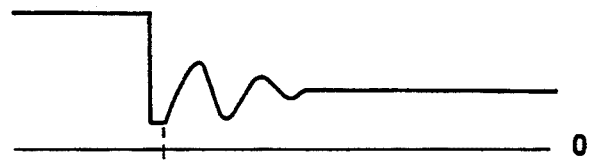
FIG.2(a) V$_{PIC}$
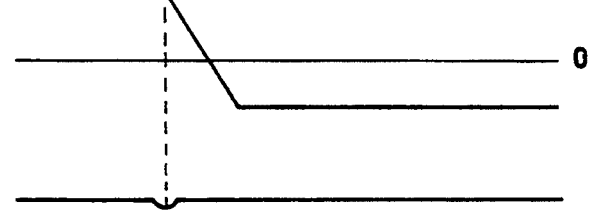
FIG.2(b) V$_{ABL}$
FIG.2(c) $\frac{EH}{V_{REG}}$
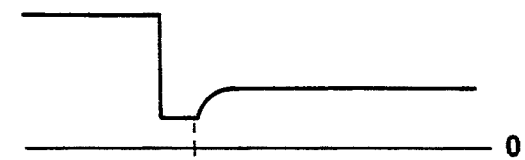
FIG.3(a) V$_{PIC}$
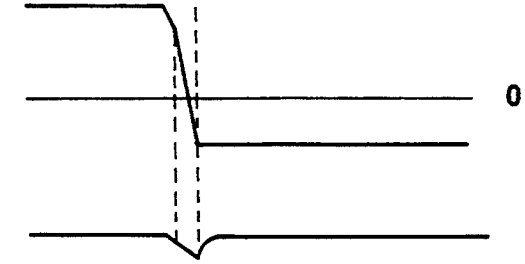
FIG.3(b) V$_{ABL}$
FIG.3(c) $\frac{EH}{V_{REG}}$

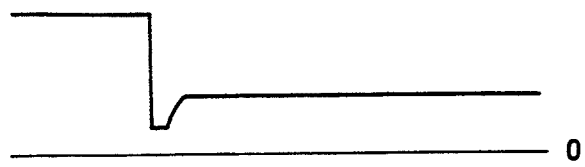
FIG.4(a) V_PIC
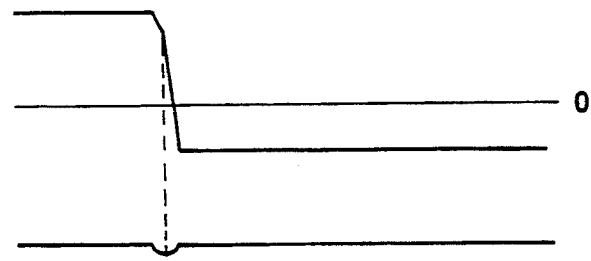
FIG.4(b) V_ABL
FIG.4(c) EH V_REG
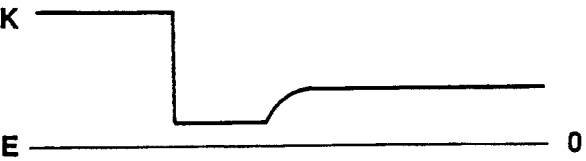
FIG.6(a) V_PIC
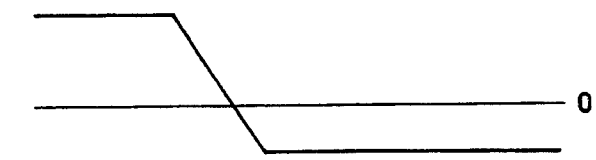
FIG.6(b) V_ABL
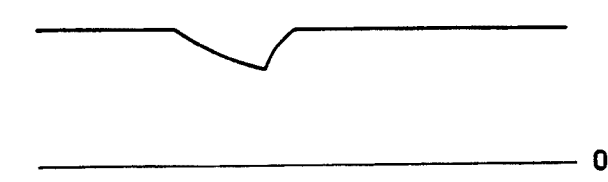
FIG.6(c) EH

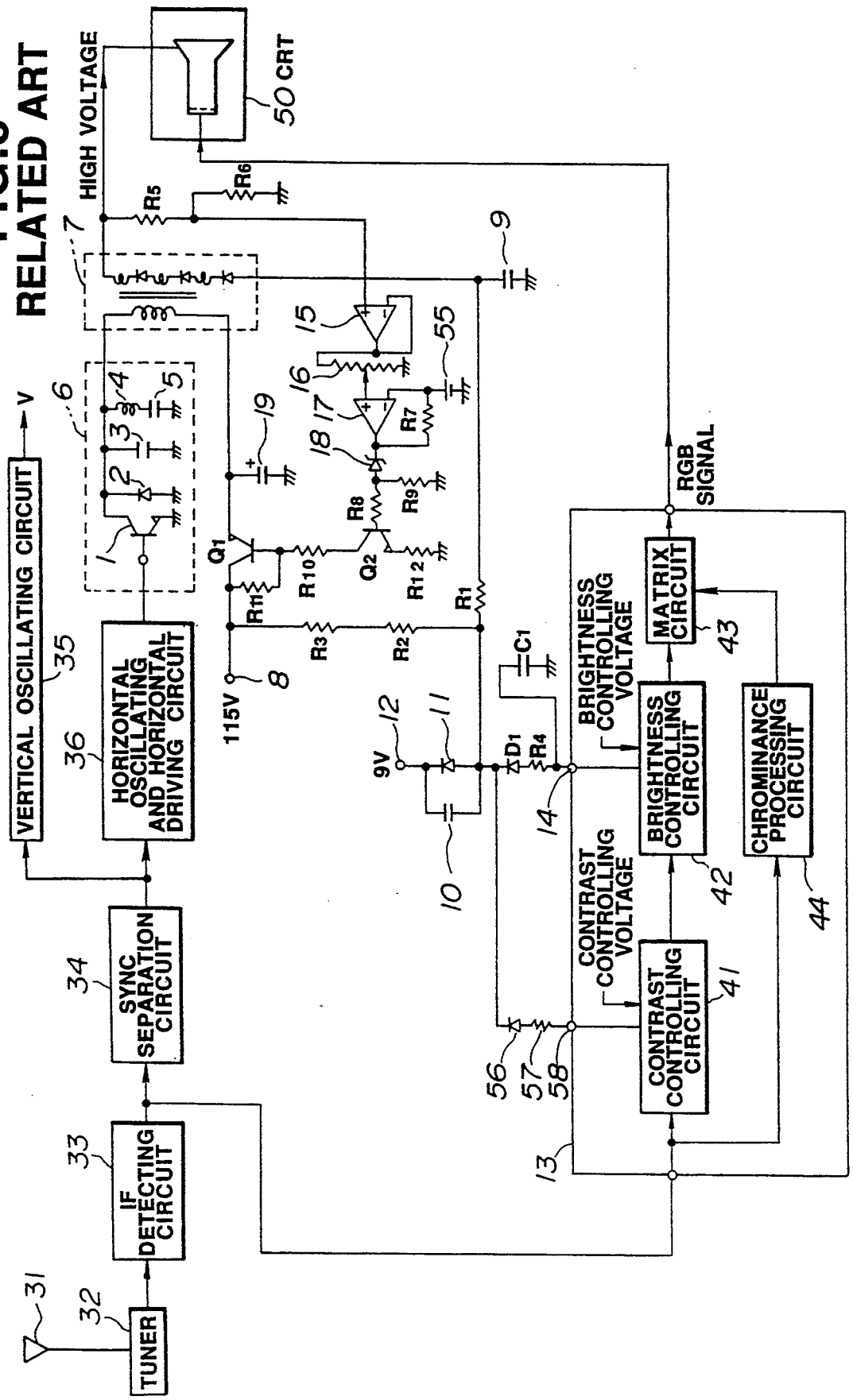

HIGH VOLTAGE STABILIZING CIRCUIT FOR USE IN COLOR TELEVISION RECEIVERS

BACKGROUND OF THE INVENTION

1. Field of the Invention

This invention relates to a high voltage stabilizing circuit to be adopted in such picture tube as of a color television receiver or the like.

2. Related Art Statement

In a color television receiver, an anode voltage (high voltage) to be fed to an anode of an picture tube (CRT) is obtained from a high voltage pulse generated in a secondary winding of a fly-back transformer (abbreviated as FBT hereinafter). When a power source is input, when a channel is switched and when a dark picture area is suddenly varied to a bright picture area, the variation of the luminance will be so remarkable that the anode voltage will reduce. A high voltage stabilizing circuit detects an anode voltage and controls an input voltage of an FBT in response to the detected result so as to stabilize the anode voltage.

FIG. 5 is a circuit diagram showing a prior art of such high voltage stabilizing circuit.

A radio frequency television (RF) signal induced in an antenna 31 is fed to a tuner 32, a predetermined channel signal is selected and is converted to an intermediate frequency (IF) signal. An IF detecting circuit 33 demodulates the IF signal and feeds a video signal of a base band to a sync separation circuit 34 and a video and chrominance signal processing block 13. The sync separation circuit 34 extracts horizontal and vertical synchronizing signals out of the video signal. The vertical synchronizing signal is fed to a vertical oscillating circuit 35 which generates saw tooth waves for vertically deflecting a CRT 50. A horizontal synchronizing signal is given to a horizontal oscillating and horizontal driving circuit 36 and a horizontal pulse is generated and is output to a horizontal output circuit 6.

On the other hand, the video signal from the IF detecting circuit 33 is given to a brightness controlling circuit 42 through a contrast controlling circuit 41 of the video and chrominance signal processing block 13. The contrast controlling circuit 41 controls the amplitude of the video signal on the basis of a contrast adjusting voltage and adjusts the contrast. The brightness controlling circuit 42 controls a direct current level of a video signal on the basis of a brightness controlling voltage and adjust the brightness. The video signal from the IF detecting circuit 33 is given also to a chrominance processing circuit 44 and is demodulated in the chrominance and a color-difference signal is given to a matrix circuit 43 which makes R, G and B signals from the luminance signal from the brightness controlling circuit 42 and the color-difference signal from the chrominance processing circuit 44 and gives them to the cathode of the CRT 50. By the way, as described later, the contrast controlling circuit 41 and brightness controlling circuit 42 limit respectively the amplitude and direct current level of the video signal on the basis of ABL operating voltages of terminals 58 and 14.

The horizontal output circuit 6 comprises an output transistor 1, damper diode 2, capacitor 3, horizontal deflecting yoke 4 and capacitor 5. With a collector-emitter path of the output transistor 1, the damper diode 2 and resonant capacitor 3 are connected in parallel and the series circuit of the horizontal deflecting yoke 4 and capacitor 5 is connected also in parallel. The horizontal output circuit 6 is connected to a power source terminal 8 through a primary winding of an FBT 7 and an emitter-collector path of a transistor Q1. A main power source voltage of, for example, 115 V (volts) is fed to the power source terminal 8. The emitter of the transistor Q 1 is connected to a reference potential point through a capacitor 19 and the emitter voltage is smoothed and is fed to the FBT 7. The horizontal output circuit 6 generates a fly-back pulse of a horizontal period by a horizontal pulse fed to the base of the transistor 1. This fly-back pulse is stepped up by the FBT 7 and a high voltage pulse is generated in the secondary winding and is fed to the anode of the CRT 50.

The high potential side of the secondary winding of the FBT 7 is connected to the reference potential point through resistors R5 and R6. The high voltage fluctuation is detected by the voltage division by the resistors R5 and R6 and the voltage of the connecting point of the resistors R5 and R6 is output through a buffer amplifier 15. The output of the buffer amplifier 15 is adjusted in the level by a variable resistor 16 and is given to a positive input end of an error amplifier 17. A negative input end of the error amplifier 17 is connected to the reference potential point through a power source 55 and is connected to an output end through a feedback resistor R7. The error amplifier 17 amplifies and outputs the output of the variable resistor 16. The output end of the error amplifier 17 is connected to the base of a transistor Q2 through a Zener diode 18 and resistor R8. The connecting point of the resistor R8 and Zener diode 18 is connected to the reference potential point through a resistor R9. The output of the error amplifier 17 is adjusted in the voltage by the Zener diode 18 and is impressed on the transistor Q2. The collector of the transistor Q2 is connected to the power source terminal 8 through resistors R10 and R11 and the connecting point of the resistors R10 and R11 is connected to the base of the transistor Q1. The emitter of the transistor Q2 is connected to the reference potential point through a resistor R12.

Now, if the anode voltage of the CRT 50 increases, the voltage of the connecting point of the resistors R5 and R6 will become high, the base potential of the transistor Q2 will become high and the electric current flowing to the reference point through the resistors R11 and R10, the collector-emitter path of the transistor Q2 and the resistor R12 from the terminal 8 will also increase. Then, the base potential of the transistor Q1 will reduce and the voltage fed to the primary winding of the FBT 7 will reduce. Thus, the level of the high voltage pulse induced in the secondary winding is made low and the high voltage is lowered. On the contrary, if the anode voltage is reduced, the base potential of the transistor Q2 will become low, the collector current of the transistor Q2 will become small and the base potential of the transistor Q 1 will become high. Then, the voltage fed to the primary winding of the FBT 7 will become large and the anode voltage (high voltage) will become stable.

In the circuit in FIG. 5, the high voltage current (anode current) flowing through the secondary winding of the FBT 7 is detected and is subjected to an auto-bright limit (ABL). That is to say, the low potential side of the secondary winding of the FBT 7 is connected to the reference potential point through a capacitor 9 for removing a tipple portion and is connected to the power source terminal 8 through the resistors R1, R2 and R3.

The anode current flows through the resistors R3 to R1 and the FBT 7 from the power source terminal 8. With the increase of the anode current, the voltage (ABL operating voltage) of the connecting point of the resistors R1 and R2 will reduce. This connecting point is connected to the power source terminal 12 through the parallel circuits of the capacitor 10 and diode 11 and is connected to a brightness controlling terminal 14 of the video and chrominance signal processing block 13 through the diode D1 and resistor R4. The terminal 14 is connected also to the reference potential point through a capacitor C1.

Now, if the beam current (anode current) of the CRT 50 is comparatively small and the voltage of the connecting point of the resistors R1 and R2 is comparatively high as usual, the anode voltage of the diode 11 will be higher than the low voltage (of, for example, 9V) fed to the power source terminal 12 and the diode 11 will conduct. Thereby, a fixed voltage of 9V will be impressed on the terminal 14 of the video and chrominance signal processing block 13. The brightness controlling circuit 42 will not ABL operate at this low voltage of 9V.

Here, if the beam current of the CRT 50 increases over the predetermined value, then the ABL operating voltage of the connecting point of the resistors R1 and R2 will reduce to the predetermined value, the anode voltage of the diode 11 will reduce and the diode 11 will be off. Thereby, the low voltage source will be equivalent to be cut off the terminal 14 and the voltage of the terminal 14 will vary (reduce) depending on the ABL operating voltage of the connecting point of the resistors R1 and R2, that is, on the beam current of the CRT 50. When the voltage of the terminal 14 becomes below the predetermined value, a brightness controlling circuit 42 will start the ABL operation and will limit the direct current of the video signal. The ABL operating voltage will be given also to a contrast controlling circuit 41 through a diode 56, resistor 57 and terminal 58. When the terminal 58 becomes below the predetermined value, the contrast controlling circuit 41 will start the ABL operation and will reduce the amplitude of the video signal. By the ABL operation, the anode current of the CRT 50 will be limited and the increase of the average luminance will be prevented.

Now, depending on the high voltage load fluctuation or the like of the FBT 7, even by the above described high voltage stability controlling loop, high voltage fluctuation may not be controlled. FIG. 6 shows waveform diagrams for explaining this problem. FIG. 6(a) shows a video signal Vpic fed to the anode of the CRT 50, FIG. 6(b) shows an ABL operating voltage VABL and FIG. 6(c) shows a variation of a high voltage EH.

Now, for example, if the picture suddenly varies from black to white, at this varying point, the video signal fed to the anode of the CRT 50 will suddenly vary (FIG. 6(a)). Thereby, the anode current will suddenly increase and the high voltage will fall. With the fall of the high voltage, the voltage fed to the FBT 7 will increase. However, a voltage higher than the main power source voltage can not be fed to the FBT 7 and the predetermined high voltage may not be reached. That is to say, in case the anode current increases very suddenly and a voltage reduction exceeding the controlled dynamic range of a high voltage stabilizing loop is generated, as shown in FIG. 6(c), the high voltage will reduce. Then the fluctuation of the horizontal and vertical amplitude will become large and the picture quality will remarkably deteriorate.

By the way, in case a white peak current flows longer than a predetermined time, by the above described ABL operation, the anode current will be controlled and the reduction of the high voltage will be suppressed. However, by a smoothing capacitor 9 or the like, as shown by FIG. 6(b), the variation of the ABL operating voltage will be slow. Therefore, as shown in FIGS. 6(b) and (c), a comparatively long time will elapse until the brightness controlling circuit 42 or the like starts the ABL operation against the voltage reduction exceeding the controlled dynamic range of the high voltage stabilizing loop and the high voltage returns to the predetermined value.

Thus, there has been a problem that, when a sharp white peak video is displayed, the reduction of a high voltage will deviate from the controlled range of the high voltage stabilizing loop and the picture quality will remarkably deteriorate.

OBJECTS AND SUMMARY OF THE INVENTION

An object of the present invention is to provide a high voltage stabilizing circuit which can control a high voltage fluctuation and can improve the picture quality.

Another object of the present invention is to provide a high voltage stabilizing circuit which can recover in a moment a high voltage of an picture tube having reduced over the controlled range of a high voltage stabilizing loop.

Another object of the present invention is to provide a high voltage stabilizing circuit which can recover within a short time a high voltage of an picture tube having reduced over the controlled range of a high voltage stabilizing loop by forcibly varying an operating voltage for starting an automatic luminance limiting operation.

Another object of the present invention is to provide a high voltage stabilizing circuit which can recover a high voltage of an picture tube having reduced over the controlled range of a high voltage stabilizing loop by reducing the luminance in a moment and can prevent the luminance of the picture area from being vibrated by the forcible control of the luminance.

A high voltage stabilizing circuit according to the present invention comprises a video outputting means amplifying an input video signal and feeding it to an picture tube, a high voltage generating means feeding a high voltage to an anode of said picture tube, a high voltage stabilizing means detecting said high voltage, controlling said high voltage generating means on the basis of the detected result and stabilizing said high voltage, a luminance controlling means wherein an operating voltage based on the anode current of said picture tube is given to a control end and, when this operating voltage exceeds a predetermined threshold value, said video outputting means will be controlled to control the luminance of the video displayed in said picture tube, a detecting means detecting that said high voltage has reduced over the controlled range of said high voltage stabilizing means and a luminance forcibly controlling means forcibly controlling the luminance of the video when it is shown by the detected result of this detecting means that said high voltage has exceeded the controlled range of said high voltage stabilizing means.

The other features and advantages of the present invention will become apparent enough with the following explanations.

BRIEF DESCRIPTION OF THE DRAWINGS

FIG. 1 is a circuit diagram showing a high voltage stabilizing circuit embodying the present invention.

FIG. 2 to 4 are waveform diagrams for explaining the operation of the present invention.

FIG. 5 is a circuit diagram showing an example of prior art of a high voltage stabilizing circuit.

FIG. 6 shows waveform diagrams for explaining the problem of the circuit in FIG. 5.

DETAILED DESCRIPTION OF THE PREFERRED EMBODIMENT

FIG. 1 is a circuit diagram showing a high voltage stabilizing circuit embodying the present invention.

A radio frequency television (RF) signal is induced in an antenna 31 and is fed to a tuner 32 which selects a signal of a predetermined channel and converts it to an intermediate frequency (IF) signal. An IF detecting circuit 33 amplifies the IF signal, then demodulates it and outputs video signals of the base band to a sync separation circuit 34 and a video and chrominance signal processing block 13. The sync separation circuit 34 extracts horizontal and vertical synchronizing signals out of the video signal, gives the vertical synchronizing signal to a vertical oscillating circuit 35 and gives the horizontal synchronizing signal to a horizontal oscillating and horizontal driving circuit 36. The vertical oscillating circuit 35 generates saw tooth waves for vertically deflecting a CRT 50. The horizontal oscillating and horizontal driving circuit 36 generates a horizontal pulse for horizontal deflection from the horizontal synchronizing signal and outputs it to a horizontal output circuit 6.

The video and chrominance signal processing block 13 comprises a contrast controlling circuit 41, brightness controlling circuit 42, matrix circuit 43 and chrominance processing circuit 44. The input video signal is adjusted in the contrast and brightness and is then converted to R, G and B signals which are fed to the cathode of the CRT 50. That is to say, the contrast controlling circuit 41 adjusts the amplitude of the video signal on the basis of the contrast controlling voltage and the brightness controlling circuit 42 adjusts the direct current level of the video signal on the basis of the brightness controlling voltage. The chrominance processing circuit 44 chrominance-demodulates the video signal to obtain a color-difference signal and the matrix circuit 43 matrix-processes the luminance signal from the brightness controlling circuit 42 and the color-difference signal from the chrominance processing circuit 44 to obtain R, G and B signals. When the voltages of respective terminals 58 and 14 reduce to be below a predetermined value, the contrast controlling circuit 41 and brightness controlling circuit 42 will start the ABL operation to limit the amplitude and direct current level of the video signal.

On the other hand, a main power source voltage of, for example, 115V is fed to a power source terminal 8 which is connected to one end of the primary winding of the FBT 7 through a collector-emitter path of a transistor Q1 and this one end is connected also to a reference potential point through a capacitor 19. Between the other end of the primary winding of the FBT 7 and the reference potential point, a collector-emitter path of a horizontal output transistor 1, damper diode 2 and resonant capacitor 3 forming a horizontal output circuit 6 are connected in parallel. With the collector-emitter path of the horizontal output transistor 1, a series circuit of a horizontal deflecting yoke 4 and capacitor 5 is connected in parallel. A horizontal pulse is given to the base of the horizontal output transistor 1 of the horizontal output circuit 6. A saw tooth wave current of a horizontal period flows through the horizontal deflecting yoke 4. A fly-back pulse of a horizontal period is generated in the collector of the horizontal output transistor 1.

One end of the secondary winding of the FBT 7 is connected to the reference potential point through a capacitor 9 and the other end is connected to the anode of the CRT 50. The fly-back pulse from the horizontal output circuit 6 is stepped up in the voltage to generate a high voltage.

The other end of the secondary winding of the FBT 7 is connected to the reference potential point through resistors R5 and R6. The connecting point of the resistors R5 and R6 is connected to the positive input end of a buffer amplifier 15. A voltage based on the anode voltage (high voltage) is fed to the buffer amplifier 15. The output end of the buffer amplifier 15 is connected to the negative input end and is connected also to the reference potential point through a variable resistor 16. The sliding end of the variable resistor 16 is connected to the positive input end of an error amplifier 17. The negative input end of the error amplifier 17 is connected to the reference potential point through a voltage source 55 and is connected also to the output end through a resistor R7. Also, the output end of the error amplifier 17 is connected to the base of a transistor Q2 through a Zener diode 18 and resistor R8. The connecting point of the resistor R8 and Zener diode 18 is connected to the reference potential point through a resistor R9.

The output of the error amplifier 17 is adjusted in the level by the Zener diode 18. In the transistor Q2, the emitter is connected to the reference potential point through a resistor R12 and the collector is connected to the power source terminal 8 through resistors R10 and R11. The connecting point of the resistors R10 and R11 is connected to the base of the transistor Q1. A high voltage stabilizing loop is formed of these resistors R5 to R11, FBT 7, buffer amplifier 15, variable resistor 16, error amplifier 17, Zener diode 18, transistors Q1 and Q2 and voltage source 55.

On the other hand, one end of the secondary winding of the FBT 7 is connected to the power source terminal 8 through resistors R1, R2 and R3. The connecting point of the resistors R1 and R2 is connected to a power source terminal 12 to which a low voltage of, for example, 9V is fed through a parallel circuit of a capacitor 10 and diode 11 and is connected also to a brightness controlling terminal 14 of the video and chrominance signal processing block 13 through a diode D 1 and resistor R4. When the ABL operating voltage reduces and the terminal 58 and brightness controlling terminal 14 become below respective predetermined threshold values, the contrast controlling circuit 41 and brightness controlling circuit 42 of the video and chrominance signal processing block 13 will limit the direct current level and amplitude of the video signal. That is to say, the video and chrominance signal processing block 13 controls the luminance or contrast to prevent an over current from flowing to the anode of the CRT 50 and can perform the ABL operation to control the average luminance.

In this embodiment, the terminal 14 of the video and chrominance signal processing block 13 is connected also to the collector of a transistor Q3 through a resistor R27 and diode D2 and the connecting point of the resistors R1 and R2 is connected to the collector of a transistor Q4 through a diode D3 and resistor R26. These transistors Q3 and Q4 are controlled by the output of the error amplifier 17. That is to say, the output end of the error amplifier 17 is connected also to the negative input end of a comparator 21. A reference voltage is fed to the positive input end of the comparator 21 from a reference power source 22. The comparator 21 compares the output of the error amplifier 17 with the reference voltage. When the high voltage reduces and the output voltage of the error amplifier 17 reduces to be lower than the sum voltage of the voltage between the base and emitter of the transistor Q2 and the Zener voltage of the Zener diode 18, the comparator 21 will output an output of a high level (mentioned as "H" hereinafter).

The output end of the comparator 21 is connected to the base of a transistor Q3 through a resistor R21 and the base of the transistor Q3 is connected also to the reference potential point through a resistor R22. The emitter of the transistor Q3 is connected to the reference potential point and the collector is connected to a power source terminal 23 through a resistor R23 so as to be fed with a voltage $V_B$. The output end of the comparator 21 is connected also to the base of a transistor Q4 through a Zener diode $V_{z1}$ and resistor R24. The emitter of the transistor Q4 is connected to the base through a resistor R25 and is connected to a power source terminal 24 through a Zerner diode $V_{z2}$ so as to be fed with a negative voltage-$V_v$.

By the way, it is set that, when the transistor Q4 is on, the collector voltage of the transistor Q4 determined by the voltage -$V_D$ and Zener voltage will be below the ABL operating voltage for the video and chrominance signal processing block 13 to ABL operate.

The operation of the thus formed embodiment shall be explained in the following with reference to the waveform diagrams in FIGS. 2 to 4. FIG. 2(a) shows a video signal $V_{pic}$ fed to the cathode of the CRT 50, Fig. 2(b) shows an ABL operating voltage $V_{ABL}$ of the connecting point of the resistors R1 and R2 and FIG. 2(c) shows a high voltage $E_H$ fed to the anode of the CRT 50 and a regular voltage $V_{REG}$ of the output end of the operating amplifier 17 which is a voltage detecting this high voltage. FIGS. 3(a) to (c) and FIGS. 4(a) to (c) correspond respectively to FIGS. 2(a) to (c).

The FBT 7 boosts the fly-back pulse from the horizontal output circuit 6 and feeds the high voltage to the anode of the CRT 50. The resistors R5 and R6 forming a high voltage stabilizing loop detect a high voltage fluctuation by a voltage division and gives it to the variable resistor 16 through the buffer amplifier 15. The voltage detected by the resistors R5 and R6 is adjusted in the level by the variable resistor 16, is amplified by the error amplifier 17 and is output. The output of the error amplifier 17 is fed to the base of the transistor Q2 through the Zener diode 18 and resistor R8. When the anode voltage of the CRT rises, the current flowing through the collector-emitter path of the transistor Q2 will become large, the base potential of the transistor Q 1 will reduce and the voltage fed to the primary winding of the FBT 7 will reduce. Thereby, the rise of the anode voltage will be controlled. On the contrary, when the anode voltage lowers, the current flowing through the collector-emitter path of the transistor Q2 will become small, the base potential of the transistor Q 1 will become high and the voltage fed to the primary winding of the FBT 7 will rise to control the reduction of the anode voltage.

Now, if a white peak video is displayed and the reduction of the high voltage exceeds the controlled range of the high voltage stabilizing loop, the output of the error amplifier 17 will reduce to be lower than the sum voltage of the Zener voltage of the Zener diode 18 and the voltage between the base and emitter of the transistor Q2. Then the output of the error amplifier 17 will become lower than the reference voltage of the reference power source 22 and the comparator 21 will output an "H" output. Thereby, the transistors Q3 and Q4 will be on. FIGS. 2 and 3 are to explain the control in case the respective transistors Q3 and Q4 are independently on. By the way, in fact, the transistors Q3 and Q4 will be simultaneously on and the control shown in FIG. 4 will be made.

When the comparator 21 outputs an "H" output in a sudden variation from black to white of the video signal $V_{pic}$ shown in FIG. 2(a), the transistor Q3 will be on, the diode D2 will be also on and the voltage of the brightness controlling terminal 14 of the video and chrominance signal processing block 13 will be reduced in a moment to be below the predetermined value. Thereby, the brightness controlling circuit 42 of the video and chrominance signal processing block 13 will limit the direct current level of the luminance signal within a very short time from the reduction of the high voltage. Then the video signal $V_{pic}$ will vary to be on the black level side in the timing of the broken line in FIG. 2 (Fig. 2(a)) and the high voltage will rise to return to the original value (Fig. 2(c)). However, when the high voltage returns to the original value, the output of the comparator 21 will become "L" and therefore the transistor Q3 will again become off. Thereby, the luminance of the video signal will rise and the video signal $V_{pic}$ will again deviate from the controlled range of the high voltage stabilizing loop. Thus, the transistor Q3 will be again on and the above described forcible control of the luminance will be repeated. That is to say, with only the forcible voltage control of the brightness controlling terminal 14, the high voltage will be stabilized but the luminance will vibrate as shown in FIG. 2(a). The level fluctuation of the video signal $V_{pic}$ will continue until the ABL operating voltage of the connecting point of the resistors R1 and R2 reduces to be below the predetermined value.

On the other hand, in case only the transistor Q4 of the transistors Q3 and Q4 is made on by the "H" output of the comparator 21, the Zener diodes $V_{z1}$ and $V_{z2}$ together with the transistor Q4 will be on and the collector voltage of the transistor Q4 will be of a voltage value determined mostly by the voltage -$V_D$ of the power source terminal 24 and the Zener voltage of the Zener diode $V_{z2}$. Then the diode D3 will conduct, the capacitor 10 will be charged and the voltage (ABL operating voltage) of the connecting point of the diode D3 and capacitor 10 will be substantially the collector voltage of the transistor Q4. That is to say, as shown in Figs. 3(a) and (b), within a comparatively short time after the output of the comparator 21 varies from the low level to the "H", the ABL operating voltage will reduce to the collector voltage of the transistor Q4, that is, to a predetermined low voltage required for the video and chrominance signal processing block 13 to control the brightness.

However, the capacitor 10 charging time is comparatively long and the time elapsing until the ABL operating voltage becomes below the predetermined value is comparatively long. That is to say, for a period longer than the white peak period shown in FIG. 2(a), the video signal $V_{pic}$ will maintain the white peak (FIG. 3(a)). Therefore, in such case, as shown in FIG. 3(c), the reduction of the high voltage will be large and the deterioration of the picture quality will be comparatively large.

Therefore, in this embodiment, the transistors Q3 and Q4 are simultaneously processed. That is to say, when the high voltage reduces over the controlled range of the high voltage stabilizing loop, the comparator 21 will output an "H" output and the transistors Q3 and Q4 will be on. When the transistor Q3 is on, the voltage of the terminal 14 will reduce in a moment and, as shown in FIGS. 4(a) and (b), the brightness controlling circuit 42 will start an ABL operation. Thereby, the white peak of the video signal $V_{pic}$ will be controlled to vary to the black level side. On the other hand, the transistor Q4 will be on simultaneously with the transistor Q3. During the period of the ABL operation by the transistor Q3, the capacitor 10 will be forcibly charged to reduce the ABL operating voltage of the connecting point of the resistors R1 and R2. Thereby, when the forcible ABL operation by the transistor Q3 ends, the capacitor 10 will be charged by the transistor Q4 and the voltage of the resistors R1 and R2 will reduce to the ABL operating voltage starting the ABL operation.

That is to say, before the anode voltage of the CRT 50 returns to the voltage within the controlled range of the high voltage stabilizing loop and the output of the comparator 21 varies to the "L" by the forcible brightness control of the transistor Q3, the ABL operating voltage will be made below the predetermined value at which the ABL operation can be started by setting the forcible ABL operating voltage of the transistor Q4.

Thereby, the contrast controlling circuit 41 and the brightness controlling circuit 42 will then start an ABL operation based on the beam current of the CRT 50 to limit the amplitude and direct current level of the video signal. That is to say, even after the transistors Q3 and Q4 are off, the capacitor 10 will hold an ABL operating voltage enabling a brightness control, the diode D1 will be on and the white peak will continue to be controlled by the video and chrominance signal processing block 13.

Thus, in this embodiment, it is detected from the output of the operating amplifier 17 that the anode voltage has reduced over the controlled range of the high voltage stabilizing loop, a forcible brightness control is made in a moment by the detected result, the ABL operating voltage is reduced within a short time, the response to the ABL operation is made fast and the anode voltage is returned into the controlled range of the high voltage stabilizing loop. The forcible brightness control and the ABL operating voltage reduction are ended within about two vertical periods and the deterioration of the picture quality by the high voltage fluctuation can be remarkably controlled.

In the present invention, it is apparent that different working modes in a wide range can be formed on the basis of the present invention without deviating from the spirit and scope of the invention. The present invention is not restricted by its specific working modes except being limited by the appended claims.

What is claimed is:

1. A high voltage stabilizing circuit comprising:
   video signal processing means, having an input terminal, a control terminal and an output terminal, for amplifying a video signal fed to the input terminal and for outputting the amplified video signal to the output terminal;
   a picture tube, having an anode, for receiving the amplified video signal from the video signal processing means;
   high voltage generating means for feeding a high voltage to the anode;
   high voltage stabilizing means for detecting a fluctuation of the high voltage and for controlling, in accordance with the detected fluctuation, the high voltage generating means so as to stabilize the high voltage;
   luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;
   detecting means for detecting when the high voltage has varied over a predetermined controlled range of the high voltage stabilizing means, said detecting means including:
      comparing means for comparing the high voltage with a predetermined reference direct current voltage; and
   luminance forcing means for forcibly feeding a voltage, which is used by the control terminal for controlling the luminance level, to the control terminal when the detecting means detects that the high voltage has exceeded the predetermined controlled range of the high voltage stabilizing means, said luminance forcing means including:
      a transistor having a collector connected to a voltage source, an emitter connected to a reference potential point and a base connected to the comparing means so as to receive a comparison result which is indicative of the comparison of the high voltage with the predetermined reference direct current voltage, the transistor operating in response to the comparison result; and
      a single direction conducting element between the control terminal and the collector, the single direction conducting element conducting when the transistor operates.

2. A high voltage stabilizing circuit comprising:
   video signal processing means having an input terminal, a control terminal and an output terminal, for amplifying a video signal fed to the input terminal and for outputting the amplified video signal to the output terminal;
   a picture tube, having an anode, for receiving the amplified video signal from the video signal processing means;
   high voltage generating means for feeding a high voltage to the anode;
   a high voltage stabilizing means for detecting a fluctuation of the high voltage and for controlling, in accordance with the detected fluctuation, the high voltage generating means so as to stabilize the high voltage;

luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;

detecting means for detecting when the high voltage has varied over a predetermined controlled range of the high voltage stabilizing means, the detecting means including:

comparing means for comparing the high voltage with a predetermined reference direct current voltage; and luminance forcing means for reducing the operating voltage to a predetermined threshold value when the detecting means detects that the high voltage has exceeded the predetermined controlled range of the high voltage stabilizing means, the luminance forcing means including:

a transistor having an emitter connected to a low potential point, and a base connected to the comparing means so as to receive a comparison result, which is indicative of the comparison of the high voltage with the predetermined reference direct current voltage, the transistor operating in response to the comparison result; and a single direction conducting element between a collector of the transistor and the luminance controlling means so as to feed the operating voltage to the transistor, the single direction conducting element conducting when the transistor operates.

3. A high voltage stabilizing circuit comprising:

video signal processing means, having an input terminal, a control terminal and an output terminal, for amplifying a video signal fed to the input terminal and for outputting the amplified video signal to the output terminal;

a picture tube, having an anode, for receiving the amplified video signal from the video signal processing means;

high voltage generating means for feeding a high voltage to the anode;

high voltage stabilizing means for detecting a fluctuation of the high voltage and for controlling, in accordance with the detected fluctuation, the high voltage generating means so as to stabilize the high voltage;

luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;

detecting means for detecting when the high voltage has varied over a predetermined controlled range of the high voltage stabilizing means, the detecting means including:

comparing means for comparing the high voltage with a predetermined reference direct current voltage; and luminance forcing means for forcibly feeding a voltage, which is used by the control terminal for controlling the luminance level, to the control terminal and for reducing the operating voltage to a predetermined threshold value when the detecting means detects that the high voltage has exceeded the predetermined controlled range of the high voltage stabilizing means, the luminance forcing means including:

a first transistor having a collector connected to a voltage source, an emitter connected to a reference potential point and a base connected to the comparing means so as to receive a comparison result, which is indicative of the comparison of the high voltage with the predetermined reference direct current voltage, the first transistor operating in response to the comparison result;

a first single direction conducting element between the control terminal and the collector of the first transistor, the first single direction conducting element conducting when the first transistor operates;

a second transistor having an emitter connected to a low potential point and a base connected to the comparing means so as to receive the comparison result, the second transistor operating in response to the comparison result; and a second single direction conducting element between a collector of the second transistor and the luminance controlling means so as to feed the operating voltage to the second transistor, the second single direction conducting element conducting when the second transistor operates.

4. A high voltage stabilizing circuit comprising:

video signal processing means, having an input terminal, a control terminal and an output terminal, for amplifying a video signal fed to the input terminal and for outputting the amplified video signal to the output terminal;

a picture tube having an anode, for receiving the amplified video signal from the video signal processing means;

a fly-back transformer, having a primary winding and a secondary winding, for generating a fly-back pulse in the secondary winding;

high voltage generating means for rectifying the fly-back pulse and for feeding a high voltage to the anode;

dividing means, having a resistance circuit network, for dividing the high voltage, thereby producing a divided high voltage means for controlling a voltage fed to the primary winding of the fly-back transformer in accordance with the divided high voltage, thereby stabilizing the high voltage;

means for generating an operating voltage which varies in response to an anode current of the picture tube when the anode current exceeds a predetermined value;

luminance controlling means for feeding the operating voltage to the control terminal and for controlling a luminance of the amplified video signal;

detecting means for comparing the divided high voltage with a predetermined reference direct current voltage, for detecting, in accordance with the comparison of the divided high voltage with the predetermined reference direct current voltage, when the high voltage has varied over a predetermined controlled range of the dividing means, and for producing an output signal in accordance with a detection result of the detecting means;

a first transistor having a collector connected to a voltage source, an emitter connected to a reference potential point and a base connected to the detecting means so as to receive the output signal, the first transistor operating in response to the output signal;

a first single direction conductive element between the control terminal and the collector of the first transistor, the first single direction conductive element conducting when the first transistor operates;

a second transistor having an emitter connected to a low potential point and a base connected to the detecting means so as to receive the output signal, the second transistor operating in response to the output signal; and a second single direction conductive element between the generating means and a collector of the second transistor so as to feed the Operating voltage to the second transistor, the second single direction conductive element conducting when the second transistor operates.

5. A high voltage stabilizing circuit for use in color television receivers, the high voltage stabilizing circuit comprising:

video signal processing means, having an input terminal, a control terminal and an output terminal, for amplifying a video signal fed to the input terminal and for outputting the amplified video signal to the output terminal;

a picture tube, having an anode, for receiving the amplified video signal from the video signal processing means;

high voltage generating means for feeding a high voltage to the anode;

high voltage detecting means for generating a first voltage which is proportional to the high voltage;

high voltage stabilizing means for controlling, in accordance with a variation of the first voltage, the high voltage generating means, thereby stabilizing the high voltage;

luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;

comparing means, having a first reference voltage source which generates a first reference voltage, for comparing the first reference voltage with the first voltage and for immediately generating an output signal when the first voltage is lower than the first reference voltage; and luminance forcing means for feeding a voltage to the control terminal in accordance with the output signal from the comparing means, the control terminal controlling the luminance level in accordance with both the voltage fed by the luminance forcing means and the operating voltage fed by the luminance controlling means.

6. A high voltage stabilizing circuit for use in color television receivers, the high voltage stabilizing circuit comprising:

video signal processing means, having an input terminal a control terminal and an output terminal, for amplifying a video signal fed to the input terminal and for outputting the amplified video signal to the output terminal;

a picture tube, having an anode, for receiving the amplified video signal from the video signal processing means;

high voltage generating means for feeding a high voltage to the anode;

high voltage detecting means for generating a first voltage which is proportional to the high voltage;

high voltage stabilizing means for controlling, in accordance with variation of the first voltage, the high voltage generating means, thereby stabilizing the high voltage:

luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;

comparing means, having a first reference voltage source which generates a first reference voltage, for comparing the first reference voltage with the first voltage and for immediately generating an output signal when the first voltage is lower than the first reference voltage; and luminance forcing means for immediately forcibly feeding a voltage, which is used by the control terminal for controlling the luminance level, to the control terminal in accordance with the output signal from the comparing means, wherein the luminance forcing means includes:

a transistor having a collector connected to a voltage source, an emitter connected to a reference potential point and a base connected to the comparing means so as to receive the output signal, the transistor operating in response to the output signal; and a single direction conducting element between the control terminal and the collector, the single direction conducting element conducting when the transistor operates.

7. A high voltage stabilizing circuit for use in color television receivers, the high voltage stabilizing circuit comprising:

video signal processing means having an input terminal, a control terminal and an output terminal, for amplifying a video signal fed to the input terminal and for outputting the amplified video signal to the output terminal;

a picture tube, having an anode, for receiving the amplified video signal from the video signal processing means;

high voltage generating means for feeding a high voltage to the anode;

high voltage detecting means for generating a first voltage which is proportional to the high voltage;

high voltage stabilizing means for controlling, in accordance with a variation of the first voltage, the high voltage generating means, thereby stabilizing the high voltage;

luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;

comparing means, having a first voltage reference source which produces a first voltage reference, for comparing the first reference voltage with the first voltage and for immediately producing an output signal when the first voltage is lower than the first reference voltage; and luminance forcing means for reducing the operating voltage to a predetermined threshold value in accordance with the output signal, wherein the luminance forcing means includes:

a voltage source for producing a voltage which is lower than a lower limit value of the operating voltage: and conducting means for connecting the control terminal and the voltage source, and for feeding the voltage from the voltage source to the control terminal in accordance with the output signal produced by the comparing means.

8. A high voltage stabilizing circuit for use in color television receivers, the high voltage stabilizing circuit comprising:

video signal processing means having an input terminal, a control terminal and an output terminal, for amplifying a video signal fed to the input terminal and for outputting the amplified video signal to the output terminal;

a picture tube, having an anode, for receiving the amplified video signal from the video signal processing means;

high voltage generating means for feeding a high voltage to the anode;

high voltage detecting means for generating a first voltage Which is proportional to the high voltage;

high voltage stabilizing means for controlling, in accordance with a variation of the first voltage, the high voltage generating means, thereby stabilizing the high voltage;

luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;

comparing means, having a first voltage reference source which produces a first voltage reference, for comparing the first reference voltage with the first voltage and for immediately producing an output signal when the first voltage is lower than the first reference voltage; and luminance forcing means for reducing the operating voltage to a predetermined threshold value in accordance with the output signal, wherein the luminance forcing means includes:

a transistor having an emitter connected to a low potential point, and a base connected to the comparing means so as to receive the output signal, the transistor operating in response to the output signal; and a single direction conducting element between a collector of the transistor and the luminance controlling means so as to feed the operating voltage to the transistor, the single direction conducting element conducting when the transistor operates.

9. A high voltage stabilizing circuit for use in color television receivers, the high voltage stabilizing circuit comprising:

video signal processing means, having an input terminal, a control terminal and an output terminal, for amplifying a video signal fed to the input terminal and for outputting the amplified video signal to the output terminal;

a picture tube, having an anode, for receiving the amplified video signal from the video signal processing means;

high voltage generating means for feeding a high voltage to the anode;

high voltage detecting means for generating a first voltage which is proportional to the high voltage;

high voltage stabilizing means for controlling, in accordance with a variation of the first voltage, the high voltage generating means, thereby stabilizing the high voltage;

luminance controlling means for generating an operating voltage which varies in response to an anode current of the picture tube when the anode current exceeds a predetermined value, and for feeding the operating voltage to the control terminal so as to allow the control terminal to control a luminance level of the amplified video signal;

comparing means, having a first voltage reference source which produces a first voltage reference, for comparing the first reference voltage with the first voltage and for immediately producing an output signal when the first voltage is lower than the first reference voltage; and luminance forcing means for immediately forcibly feeding a voltage, which is used by the control terminal for controlling the luminance level, to the control terminal and for reducing the operating voltage to a predetermined threshold value in accordance with the output signal.

10. A high voltage stabilizing circuit according to claim 9, wherein the luminance forcing means includes:

a first transistor having a collector connected to a voltage source, an emitter connected to a reference potential point and a base connected to the comparing means so as to receive the output signal, the first transistor operating in response to the output signal;

a first single direction conducting element between the control terminal and the collector of the first transistor, the first single direction conducting element conducting when the first transistor operates;

a second transistor having an emitter connected to a low potential point and a base connected to the comparing means so as to receive the output signal, the second transistor operating in response to the output signal; and a second single direction conducting element between a collector of the second transistor and the luminance controlling means so as to feed the operating voltage to the second transistor, the second single direction conducting element conducting when the second transistor operates.

* * * * *